United States Patent
Vijayan et al.

(10) Patent No.: US 11,240,027 B2
(45) Date of Patent: Feb. 1, 2022

(54) SYNCHRONIZING RADIUS SERVER DATABASES USING DISTRIBUTED LEDGER NETWORK

(71) Applicant: Hewlett Packard Enterprise Development LP, Houston, TX (US)

(72) Inventors: Renjith Vijayan, Bangalore (IN); Celestian K. Sebastian, Bangalore (IN); Anil Raj, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 374 days.

(21) Appl. No.: 16/266,812

(22) Filed: Feb. 4, 2019

(65) Prior Publication Data

US 2020/0252213 A1    Aug. 6, 2020

(51) Int. Cl.
*H04L 9/32* (2006.01)
*H04L 9/30* (2006.01)
(Continued)

(52) U.S. Cl.
CPC .............. *H04L 9/32* (2013.01); *G06F 16/178* (2019.01); *H04L 9/0618* (2013.01); *H04L 9/30* (2013.01);
(Continued)

(58) Field of Classification Search
CPC . H04L 9/32; H04L 9/30; H04L 9/0618; H04L 63/0892; H04L 2209/38;
(Continued)

(56) References Cited

U.S. PATENT DOCUMENTS

| 11,102,204 B1* | 8/2021 | Jacques de Kadt | ......................... H04L 41/5019 |
| 2002/0010767 A1* | 1/2002 | Farrow | .................. H04L 41/00 709/223 |

(Continued)

FOREIGN PATENT DOCUMENTS

WO    WO-2018125989    7/2018

OTHER PUBLICATIONS

P. Helebrandt, M. Bellus, M. Ries, I. Kotuliak and V. Khilenko, "Blockchain Adoption for Monitoring and Management of Enterprise Networks," 2018 IEEE 9th Annual Information Technology, Electronics and Mobile Communication Conference (IEMCON), 2018, pp. 1221-1225. (Year: 2018).*

(Continued)

*Primary Examiner* — Darren B Schwartz
(74) *Attorney, Agent, or Firm* — Sheppard Mullin Richter & Hampton LLP (57) ABSTRACT

Implementations of the disclosure are directed to using a distributed ledger network to synchronize configuration changes across a network of servers that provide authentication, authorization, and accounting (AAA). In some implementations, a method includes: receiving, at a first server that provides AAA of users that access a network, a user request to update a configuration of a database of the first server, the database including authentication credentials for users that access the network, in response to receiving the user request, transmitting a transaction to the distributed ledger network for validation, the transaction comprising a request by the first server for each server of the distributed ledger network to update their respective database configuration in accordance with the user request; and after the transaction is validated by the distributed ledger network, the first server updating its database configuration in
(Continued)

response to receiving the update comprising the validation of the transaction.

15 Claims, 5 Drawing Sheets

(51) Int. Cl.
    *G06F 16/178*     (2019.01)
    *H04L 9/06*     (2006.01)
    *H04L 29/06*     (2006.01)
    *G06F 16/27*     (2019.01)
    *H04L 9/08*     (2006.01)

(52) U.S. Cl.
    CPC ...... *H04L 63/0892* (2013.01); *H04L 2209/38* (2013.01)

(58) Field of Classification Search
    CPC ... H04L 9/0825; H04L 9/3239; G06F 16/178; G06F 16/275
    See application file for complete search history.

(56) References Cited

U.S. PATENT DOCUMENTS

| | | | | |
|---|---|---|---|---|
| 2002/0160811 A1* | 10/2002 | Jannette | ............... | H04L 47/10 455/560 |
| 2007/0124592 A1* | 5/2007 | Oyama | ............... | H04L 63/0892 713/171 |
| 2009/0007238 A1* | 1/2009 | Klein | ............... | H04W 8/08 726/4 |
| 2011/0023091 A1* | 1/2011 | Lukach | ............... | G06Q 10/06 726/4 |
| 2011/0047603 A1* | 2/2011 | Gordon | ............... | H04L 63/06 726/5 |
| 2014/0094159 A1* | 4/2014 | Raleigh | ............... | H04W 24/02 455/418 |
| 2015/0227732 A1* | 8/2015 | Doctor | ............... | G06F 21/34 726/4 |
| 2017/0103468 A1 | 4/2017 | Orsini et al. | | |
| 2017/0250972 A1* | 8/2017 | Ronda | ............... | H04L 9/08 |
| 2017/0257358 A1* | 9/2017 | Ebrahimi | ............... | G06F 21/645 |
| 2017/0364552 A1* | 12/2017 | Pattanaik | ............... | H04L 9/3297 |
| 2018/0088928 A1* | 3/2018 | Smith | ............... | H04L 9/3239 |
| 2018/0097635 A1* | 4/2018 | Moses | ............... | H04L 63/0442 |
| 2018/0115538 A1* | 4/2018 | Blake | ............... | H04L 9/14 |
| 2018/0227119 A1 | 8/2018 | Bibera et al. | | |
| 2018/0288048 A1* | 10/2018 | Gibbons | ............... | H04W 12/08 |
| 2018/0367310 A1* | 12/2018 | Leong | ............... | H04L 9/0861 |
| 2019/0058709 A1* | 2/2019 | Kempf | ............... | H04L 9/3226 |
| 2019/0163912 A1* | 5/2019 | Kumar | ............... | H04L 63/0823 |
| 2019/0227814 A1* | 7/2019 | Bregman | ............... | G06F 9/48 |
| 2019/0253258 A1* | 8/2019 | Thekadath | ............... | H04L 9/3247 |
| 2020/0084046 A1* | 3/2020 | Bessonov | ............... | H04L 9/3239 |
| 2020/0119904 A1* | 4/2020 | Philyaw | ............... | H04L 9/0637 |
| 2021/0036863 A1* | 2/2021 | Su | ............... | H04W 48/20 |
| 2021/0081404 A1* | 3/2021 | Kempf | ............... | H04L 9/321 |

OTHER PUBLICATIONS

Momot, A.; How Blockchain Can Be Used to Dramatically Improve Cybersecurity, (Research Paper), Jul. 23, 2018, 8 Pgs.

Zhang, K. et al., Towards Dependable, Scalable, and Pervasive Distributed Ledgers with Blockchains, (Research Paper), Feb. 13, 2018, 10 Pgs.

Chris Lewis, "Automatically sync Radius configuration across multiple domain controllers", available online at <http://www.serverspace.co.uk/blog/automatically-sync-radius-configuration-across-multiple-domain-controllers>, Dec. 4, 2014, pp. 1-5.

Lync, "Is there any way to Syncronize the onfiguration of 2 Radius servers?", available online at <https://social.technet.microsoft.com/Forums/lync/en-US/3a5864b8-7bdc-48f6-ab93-15f28fdf779e/is-there-any-way-to-syncronize-the-onfiguration-of-2-radius-servers?forum=winserverNIS>, Sep. 7, 2016, 6 pages.

Thenetworkcable, "Creating Redundant FreeRadius Servers with MySQL Replication", available online at <https://thenetworkcable.wordpress.com/2014/11/28/creating-redundant-freeradius-servers-with-mysql-replication/>, Nov. 28, 2014, pp. 1-6.

\* cited by examiner

SYNCHRONIZING RADIUS SERVER DATABASES USING DISTRIBUTED LEDGER NETWORK

DESCRIPTION OF RELATED ART

Authentication, Authorization, and Accounting (AAA) generally refers to network security services that are used to manage user access to a network. Authentication may refer to the method of identifying a user accessing a network. Generally, a user may be identified by credentials that may take the form of a username and password, a digital certificate, a biometric scan, some combination thereof, etc. Authorization may refer to network access privileges that are provided to an identified user. Authorization may determine what a user can and cannot do. For example, authorization may determine a user's access to the network based on geographical location or time of day, an amount of bandwidth that is allocated to the user, what virtual local area network (VLAN) the user is allowed to access, what network services or resources the user may access, etc. Accounting may refer to keeping a record of the user's activities on the network. This may include, for example, the services or resources accessed by the user, the times the user logged on and off, the amount of data accessed or transferred by the user, etc.

Remote Authentication Dial-In User Service (RADIUS) refers to a client/server networking protocol that may be used to provide centralized AAA management for users that connect and use a network service. A network server using a RADIUS authentication protocol is a RADIUS server. RADIUS servers may be used by internet service providers (ISPs) and other companies that provide networking products to authenticate users. During operation, a Network Access Server (NAS), a gateway that controls access to a network, may contain a RADIUS client component that communicates with a RADIUS server. When a user attempts to access the NAS (e.g., host server), the user may authenticate using their credentials. The user authentication data may be sent to the NAS, which in turn sends the user access request to the RADIUS server to implement authentication and authorization. A RADIUS server may use a RADIUS database to authenticate and authorize the user. For example, a RADIUS database may be used to control secure access to clients in an organization.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate the reader's understanding of various embodiments and shall not be considered limiting of the breadth, scope, or applicability of the present disclosure. It should be noted that for clarity and ease of illustration these drawings are not necessarily made to scale.

The figures are not intended to be exhaustive or to limit various embodiments to the precise form disclosed. It should be understood that various embodiments can be practiced with modification and alteration.

DETAILED DESCRIPTION

As used herein, the term "distributed ledger" generally refers to a shared digital ledger that is decentralized and shared between nodes distributed across a network. After a transaction that is approved to be written to the ledger is consented by at least the majority of the nodes, the contents of the ledger are synchronized across all the nodes. Different types of consensus mechanisms that bring in varying levels of processing requirements to agree on a transaction amongst distributed nodes may be utilized in a distributed ledger network. Examples of common consensus mechanisms include proof of work, proof of stake, proof of elapsed time, Kafka, etc. Various platforms have adopted different consensus mechanisms.

Distributed ledger technology (DLT) describes the superset of the different variations of this technology. One presently popular type of DLT is blockchain technology. While in a distributed ledger a transaction is written to the ledger after consensus, the requirement is more specific in a blockchain: transactions are aggregated in to a block and the block is appended to the last block of an existing linear chain of blocks. As such, all blockchains are a form of a distributed ledger, but all distributed ledgers are not necessarily a blockchain. BITCOIN and ETHEREUM are examples of blockchain-based platforms. Directed acyclic graphs (DAG) are another example of a common form of DLT. IOTA is an example of a DAG-based platform. HYPERLEDGER is an example of a DLT-based platform. Unless explicitly stated otherwise, implementations of the disclosure may apply to any variant of DLT, including blockchains, DAGs, etc., in a public, private, and/or hybrid networking environment.

Although embodiments of the disclosure will be primarily described in the context of blockchains, it should be appreciated that all embodiments, unless expressly stated otherwise, may be applied to other variants of distributed ledger technology. For example, to the extent an embodiment is described in the context of a blockchain network sharing a blockchain, it should be appreciated that the embodiment may more generally be applied in a distributed ledger network sharing a distributed ledger. Similarly, to the extent that an embodiment recites a "blockchain address," "a blockchain application," or "a blockchain transaction," it should be appreciated that the embodiment may more generally be applied using a "distributed ledger address," "a distributed ledger application," and/or "a distributed ledger transaction."

As used herein, the term "blockchain address" refers to an identifier for a receiver or a sender in a blockchain recorded transaction. For example, a unique blockchain addresses may be associated with a RADIUS server.

A network may have multiple RADIUS servers available with their configuration databases synchronized with each other to provide high availability and scalability across the network. For example, a campus or enterprise may utilize multiple RADIUS servers with synchronized databases to provide high availability and scalability across multiple locations. In such implementations, whenever a change is made to the configuration of the RADIUS database (e.g., adding or removing users, changing permissions of users, etc.), it may be important for a system administrator to have the latest configuration synchronized across all RADIUS servers. Further, it may be important to maintain a history of configuration changes as the RADIUS database may control the secure access of each client in an organization's network. Present techniques for RADIUS server database synchronization are limited. For example, some present techniques rely on the use of manual scripts that synchronize the configuration database of RADIUS servers to a master RADIUS server. However, such techniques are not secure and may not maintain a record of configuration changes that are made.

Implementations described herein are directed to using a distributed ledger network to synchronize configuration changes across a network of servers that provide AAA. By virtue of using a distributed ledger to synchronize configuration changes, enhanced security may be achieved by maintaining a distributed ledger of changes and requiring a consensus among the servers that provide AAA. Additionally, configuration changes may be automated across all servers.

Although implementations described herein will be primarily described in the context of RADIUS servers that utilize the RADIUS protocol, it should be appreciated that the technology described herein may be applied in networks including servers that require configuration synchronization and use some other protocol to provide AAA. For example, the technology described herein may be implemented using servers that provide AAA using a Diameter protocol.

In accordance with some implementations, RADIUS servers in a network may form a blockchain network. In this blockchain network, the blockchain may maintain a record of the RADIUS database configuration that each server maintains. Whenever there is a configuration change (e.g., as requested by an administrator), a RADIUS server may initiate a request to the blockchain network to make the configuration change. The RADIUS servers of the blockchain network may approve the change by running a consensus mechanism, including checking the validity of the requested configuration change. After the blockchain network approves the change, a record of the change is published on the blockchain and each server may update its respective database to maintain synchronization across the RADIUS servers.

Figure 1:
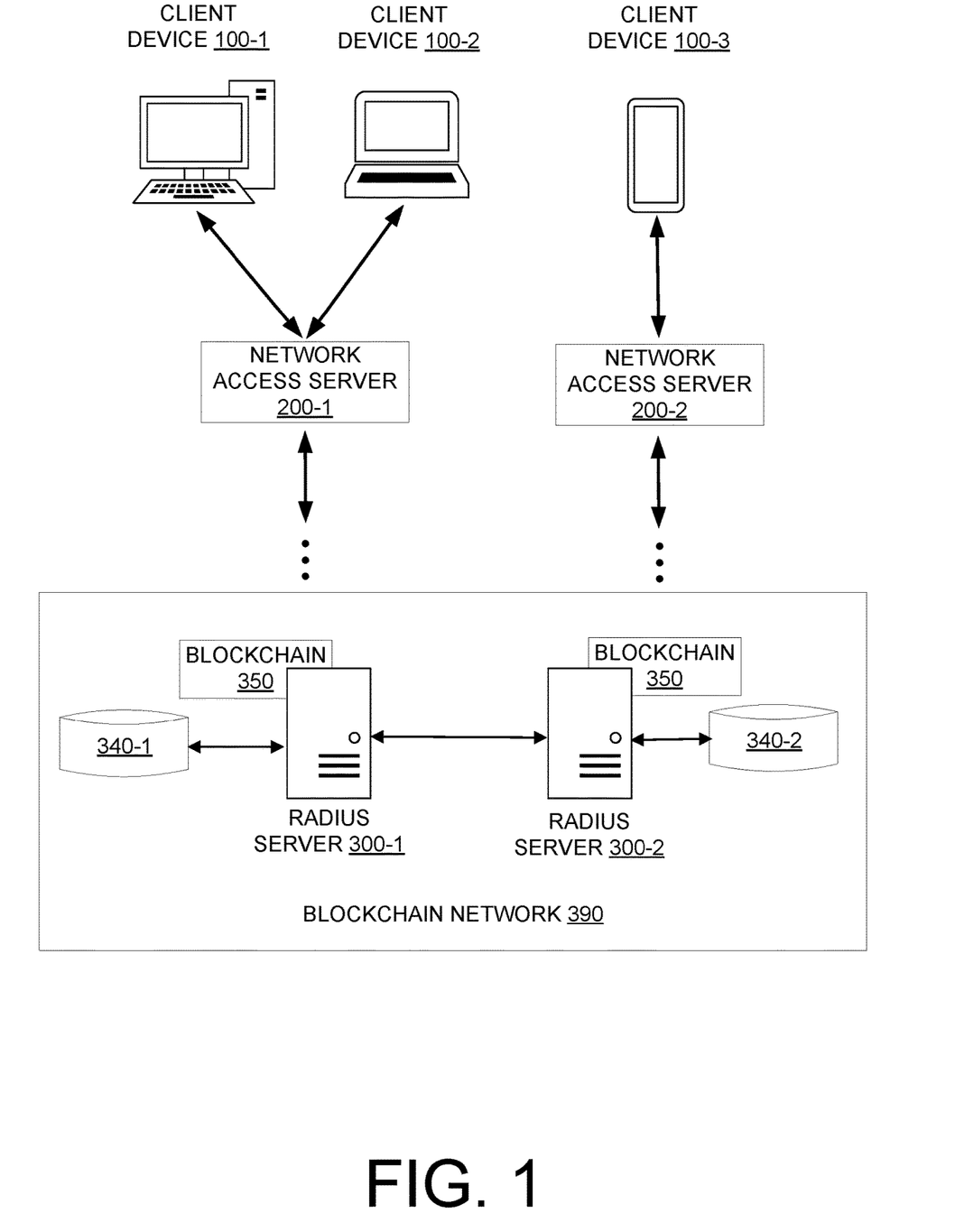
FIG. 1 illustrates an example environment in which the disclosed technology may be implemented.

FIG. 1 illustrates an example environment in which the disclosed technology may be implemented. In this example environment, RADIUS servers 300-1 and 300-2 (individually referred to as "a RADIUS server 300" and collectively referred to as "RADIUS servers 300") provide authentication, authorization, and accounting of client devices 100-1, 100-2, and 100-3 (individually referred to as a "client device 100" and collectively referred to as "client devices 100") that access a network. RADIUS servers 300 may be used to control access by client devices 100 to various types of wired and wireless networks, including: wireless networks including wireless access points, virtual private networks (VPNs), dial-up networks, etc. For example, RADIUS servers 300 may be used to support ISPs with many modems in many computers to connect to a central database, to provide a global set of credentials to be used on a public network, to provide credentials to users of an enterprise or campus, to provide enterprise Wi-Fi security with 802.1X authentication, etc. In implementations, a RADIUS server 300 may implemented using a desktop computing device, an access point with an embedded RADIUS server functionality, a router with embedded RADIUS server functionality, or some other device that may function as a RADIUS server.

A client device 100 may be any networked device (e.g., workstation, mobile devices such as laptops, tablets, or smartphones, etc.) that accesses a network that has access managed by RADIUS servers 300. Each NAS 200 (i.e., RADIUS client) may be configured to provide an entry point to the network for a client device 100 accessing the network. A NAS 200 may pass user information (e.g., credentials supplied by user of client device 100) to a RADIUS server 300 and act based on the response that is returned. For example, after a client device 100 initiates authentication with NAS 200, the NAS 200 may prompt for user credentials (e.g., username/password, challenge, etc.), receive the credentials from the client device 100, supply the credentials to a RADIUS server 300, receive a response from the RADIUS server 300 (e.g., access acceptance or rejection), and act based upon services associate with the response of the RADIUS server 300. In implementations, NAS 200 may be a wireless access point, a network access server that supports VPN remote access services or dial-up, a switch, a router, or some other device that provides an entry point to the network for a client device 100.

It should be appreciated that although the example environment of FIG. 1 shows two RADIUS servers 300 and two NAS 200, more than two RADIUS servers 300 and more than two NAS 200 may be utilized. Additionally, it should be appreciated that a RADIUS server 300 may support multiple NASs and provide a complete point-to-point connection from a client device 100, through a NAS 200, all the way to the RADIUS server 300. Further, although three client devices 100 are shown in the example of FIG. 1, many more client devices 100 may be supported (e.g., hundreds, thousands, etc.)

During operation, each of RADIUS servers 300-1 and 300-2 maintains a respective RADIUS database 340-1 and 340-2 (individually referred to as a "database 340") including user information that is used to authorize authenticate, and account users accessing the network. For example, a database 340 may maintain a list of users, including attributes, that are used by the RADIUS server to decide who can access the network. Example attributes may include a user's credentials (e.g., username and password), a user's group membership, or some other attribute defined for users. A database 340 may be implemented as an SQL database, an Active Directory database, or some other suitable database for maintaining user attributes that are used to determine network access. In some implementations, a database 340 may be implemented as flat-file.

In this example environment, the databases 340 are configured to be synchronized with each other such that RADIUS servers 300 maintain the same configurations to provide high availability and/or scalability across the network. To that end, RADIUS servers 300 function as a blockchain network 390 of devices that maintain a copy of a blockchain 350. Blockchain 350 includes information (e.g., history of RADIUS server database update transactions) that may be used to determine the present configuration and/or history of configuration changes of a database 340. As further discussed below, requested changes to the database configuration may be written to the blockchain 350 for verification such that all RADIUS servers 300 maintain a synchronized configuration.

In some implementations, security in the environment of FIG. 1 may be further enhanced by using a chain of trust whereby nodes (e.g., RADIUS servers 300) are added to the blockchain network only if it is trusted by an existing node or by making one node to act as an additional certifying authority for another node in the network.

Figure 2:
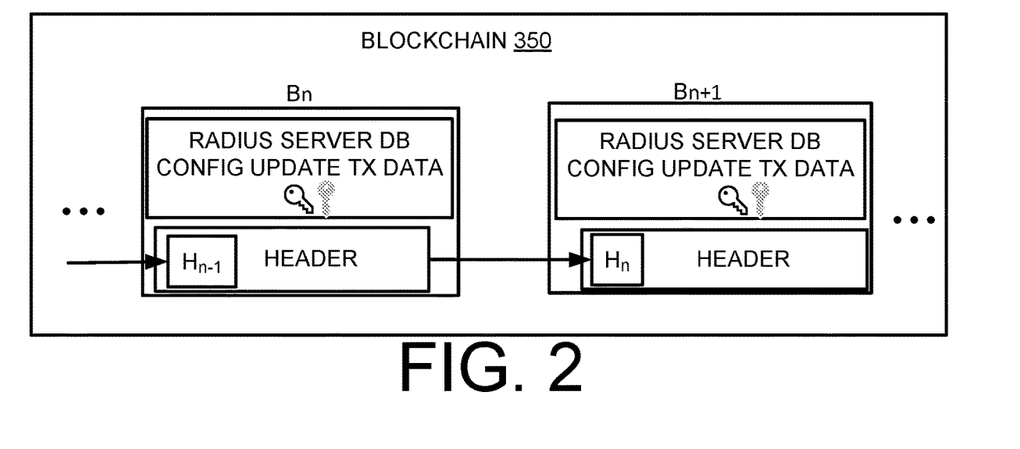
FIG. 2 illustrates one example data structure for a blockchain that may be stored on a plurality of RADIUS servers, in accordance with implementations of the disclosure.

FIG. 2 illustrates one example data structure for a blockchain 350 that may be stored on a plurality of RADIUS servers 300, in accordance with implementations of the disclosure. As illustrated, in this example, the data structure of blockchain 350 is an ordered, back-linked list of blocks, including RADIUS server database configuration update transactions made by RADIUS servers. In this specific implementation, each block of the blockchain comprises a header and transaction information related to one or multiple transactions conducted with respect to RADIUS database configuration updates on the blockchain network. The header of each block (except for e.g., the genesis block) may include the hash of the previous block header and/or hash of the transaction tree root (merkle root hash). In implementations, the header may comprise additional block metadata such as a timestamp (e.g., the approximate creation time of the block), hash trees (e.g., for transaction information, state information, etc.) and other information. It should be appreciated that many other distributed ledgers other than the blockchain illustrated by FIG. 2 may be used to implement the technology described herein.

In some implementations, blockchain 350 may implemented as a "permissioned" or "private" blockchain in which only permissioned entities (e.g., RADIUS servers 300) may validate transactions. In these implementations, upon creation/configuration of the blockchain network, each RADIUS server 300 may be assigned a unique private key to make changes and/or transactions on the blockchain. Additionally, a corresponding public key associated with the RADIUS server 300 may be distributed to the other RADIUS servers 300 and/or stored on the blockchain 350. In implementations, the private and public key pairs assigned to each RADIUS server 300 may be implemented in accordance with the digital signature algorithm (DSA), elliptic curve digital signature algorithm (ECDSA), or some other suitable algorithm.

Figure 3:
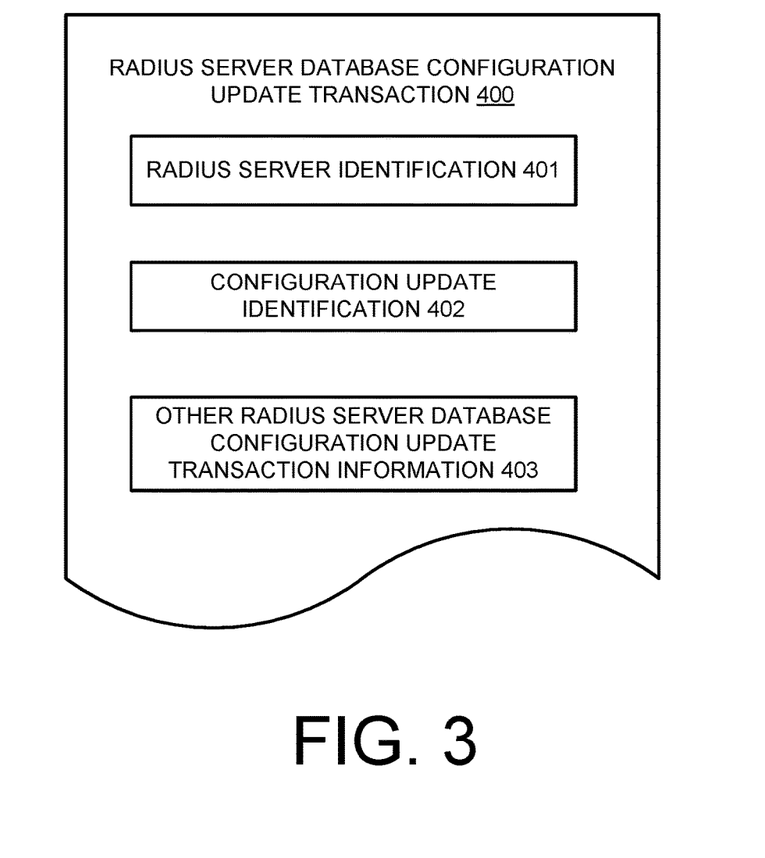
FIG. 3 illustrates an example RADIUS server database configuration update transaction that may be stored in a block of a blockchain, in accordance with implementations of the disclosure.

FIG. 3 illustrates an example RADIUS server database configuration update transaction 400 that may be stored in a block of the blockchain, in accordance with implementations. A transaction 400 may include one or more of RADIUS server identification 401 (e.g., IP address associated with the RADIUS server device broadcasting the transaction 400 to the blockchain network), configuration update identification 402 (e.g., identification of configuration change that is being made to the database 340), and other RADIUS server database configuration update transaction information 403 (e.g., MAC address associated with the RADIUS servers sharing the transaction, timestamp of transaction, public key information, etc.).

Figure 4:
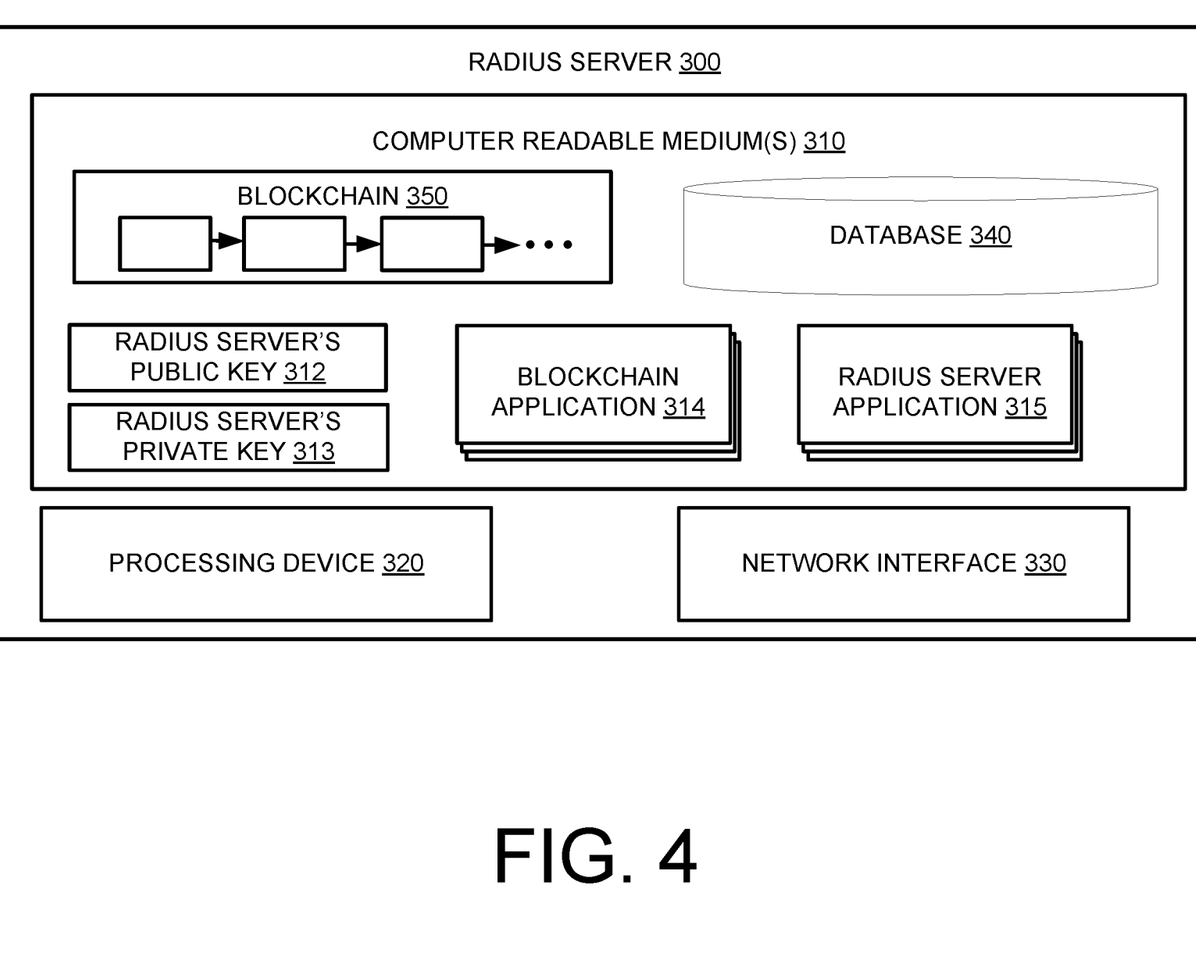
FIG. 4 is a schematic block diagram illustrating one particular example of a RADIUS server, in accordance with implementations of the disclosure.

FIG. 4 is a schematic block diagram illustrating one particular example of a RADIUS server 300, in accordance with the disclosure. As illustrated, a RADIUS server 300 may include one or more computer readable mediums 310, a processing device 320 (e.g., a processor to execute machine readable instructions such as instructions of a blockchain application 314 and/or a RADIUS server application 315), and a network interface 330 to communicate with other network devices, including NASs 200 and other RADIUS servers 300. Some non-limiting examples of communication methods that may be implemented by network devices in accordance with the disclosure may include: wired communications methods, such as cable, fiber-optic, or DSL; or wireless communications methods, such Wi-Fi, cellular communications, or satellite communications, or some combination thereof.

As illustrated, RADIUS server 300 may store a respective copy of a blockchain 350, and its own public key 312 and private key 313 that may correspond to a blockchain address for blockchain transactions. For example, a private key 313 may be generated through a blockchain application 314, a public key 312 may be derived from the private key 313, and a blockchain address may be derived from the public key 312 by applying additional cryptographic algorithm(s). In some implementations, the public key 312 and blockchain address are the same.

Private key 313 may be uniquely known by RADIUS server 300, and may be used to digitally sign RADIUS server database configuration update transactions that are submitted to the blockchain network for authentication. In some implementations, RADIUS server 300 may also store a list of public keys utilized by other RADIUS servers 300 as part of the blockchain network. For example, the list may be maintained as a table associating the IP address of each RADIUS server 300 with a respective public key. The list of other keys may be used to decrypt incoming RADIUS server database configuration update transactions submitted by other RADIUS servers to the blockchain network for verification.

RADIUS server 300 may include a database 340, which as described above, may include user information that is used to authorize, authenticate, and account users accessing the network. For example, a database 340 may maintain user credential data, user group data (e.g., where different user groups have different levels of authorized access), session data (e.g., session time and statistics for traffic to and from a user), and other data that may be read from or written to the database 340 by RADIUS server 300 to implement policies in accordance with a RADIUS protocol.

RADIUS server 300 may store a blockchain application 314 that may be used to communicate with a blockchain network including RADIUS servers 300 to make incoming RADIUS server database configuration update transactions, to validate blockchain transactions, and/or to update the blockchain 350.

RADIUS server 300 may also store a RADIUS server application 315 that may be used to perform functions in accordance with a RADIUS protocol, including authenticating, authorizing, and accounting for users. In some implementations, RADIUS server application 315 and blockchain application 314 may be integrated.

Figure 5:
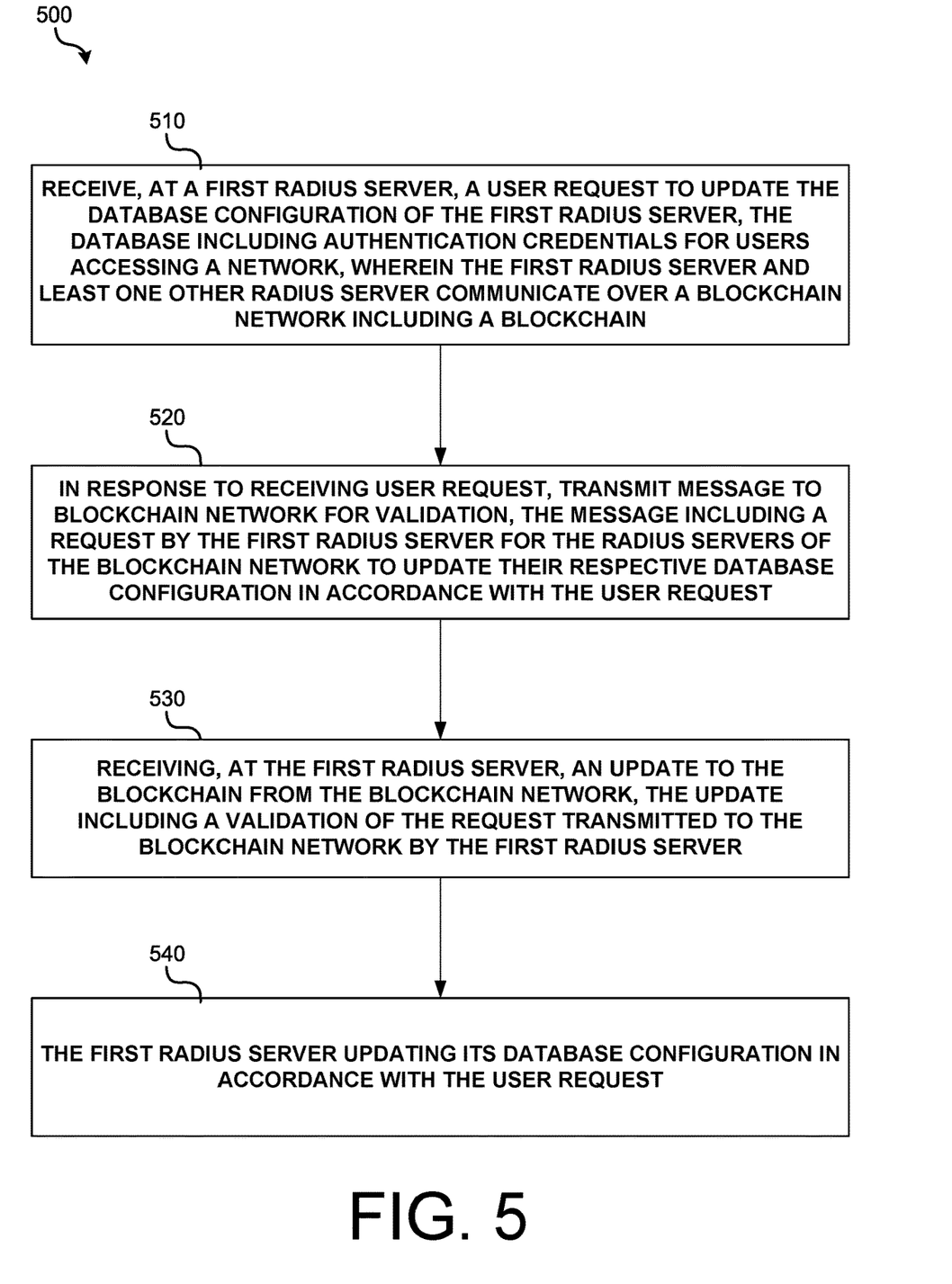
FIG. 5 is an operational flow diagram illustrating an example method that may be implemented by a RADIUS server on a blockchain network to update its database configuration, in accordance with implementations of the disclosure.

FIG. 5 is an operational flow diagram illustrating an example method 500 that may be implemented by a RADIUS server (e.g., RADIUS server 300) on a blockchain network (e.g. network 390) to update its database configuration, in accordance with implementations of the disclosure. In some implementations, method 500 may be implemented by a RADIUS server 300 using a processing device 320 to execute instructions (e.g., blockchain application 314 and/or RADIUS server application 315) stored on a computer readable medium 310.

At operation 510, a first RADIUS server receives a user request to update the configuration of its database (e.g. database 340). As noted above, in various implementations the RADIUS server's database 340 includes authentication credentials for users that access a network. Access to the network may be managed by the first RADIUS server and other RADIUS servers that maintain duplicate database configurations (e.g., duplicate user credential information, user privilege information, and user access logs). For example, all of the RADIUS servers may be configured to maintain the same configuration file for managing user access to a network.

The user request to update the database configuration may be made by an administrator that accesses first RADIUS server through a secured connection. For example, a user with administrator credentials and privileges may access the RADIUS server using a graphical user interface or command line interface (e.g., interface provided by RADIUS server application 315). In implementations, the user request to update the database configuration may include a request to add or remove a user having associated credentials, a request to modify the access privileges of a particular user or a group of users (e.g., associating a new user with access privileges), a request to set when and how frequently periodic re-authentication should occur for a logged in user, a request to set various configurations relating to operating modes of authenticity (e.g., switch port configurations), or some other request.

As noted above, the first RADIUS server may communicate with other RADIUS servers over a blockchain network including a blockchain to verify all requests to update the database configuration. The blockchain may include a history of database configuration updates made by the RADIUS servers. As such, at operation 520, in response to receiving the user request, the first RADIUS server transmits a RADIUS server database configuration update transaction or message to the blockchain network for validation, the transaction including a request by the first RADIUS server for the RADIUS servers of the blockchain network to update their respective database configuration in accordance with the user request.

The transaction may be transmitted using blockchain application 314. In some implementations, the transaction may be transmitted to the blockchain network for verification (e.g., to verify that the configuration update to the database may be made), and to update the blockchain to include the verified transaction (e.g., collectively come to a consensus). The transaction may be digitally signed using a private key 313 of the RADIUS server 300, and it may identify the RADIUS server 300 (e.g., by IP address).

In implementations, the transaction may be broadcast to all or a subset of RADIUS servers on blockchain network by the first RADIUS server. In implementations where the transaction is broadcast to a subset of RADIUS servers, the transaction may be propagated by the receiving RADIUS servers to other RADIUS servers on the blockchain network that did not receive the broadcast.

Thereafter, the RADIUS servers 300 of blockchain network 360 may come to a consensus that validates the transaction (e.g., by determining that the update to the database configuration may be made based on a current state of the database) and update the blockchain with a block including the validated transaction. Any suitable blockchain consensus mechanism such as proof-of-ownership, proof-of-work, proof-of-stake, proof-of-space, etc. may be used to validate the transaction. For instance, in one particular implementation, the consensus mechanism may comprise each of the RADIUS servers 300 validating the transaction 300 against their respective copy of the blockchain. The added block may be propagated to all RADIUS servers to update their respective copy of the blockchain.

After a consensus has been reached by the blockchain network, at operation 530, the first RADIUS server receives an update to the blockchain from the blockchain network, the update including a validation of the request transmitted to the blockchain network by the first RADIUS server. For example, the first RADIUS server (and other RADIUS servers) may receive a new block containing the validated transaction, which signifies approval of the database configuration update. In some implementations, the new block may contain more than one approved database configuration update. For example, a plurality of validated transactions corresponding to different database configuration update requests may be included in a block. The RADIUS server 300 (and other RADIUS servers on the blockchain) may update its respective copy of the blockchain 350 with the new block.

Thereafter, at operation 540, the first RADIUS server may update its configuration database in accordance with the user request. For example, the first RADIUS server may update its configuration database to add or remove a user having associated credentials, and/or to modify the access privileges of a particular user or a group of users. In some implementations, the update may be made by updating one or more configuration files (e.g., binary files, XML files, plain text files, etc.). Additionally, other RADIUS servers that are part of the blockchain network may update their respective database configuration in accordance with the user request. After the configuration database is updated, the RADIUS server may send an acknowledgement to the requesting user (e.g. administrator) that the database configuration was updated.

Figure 6:
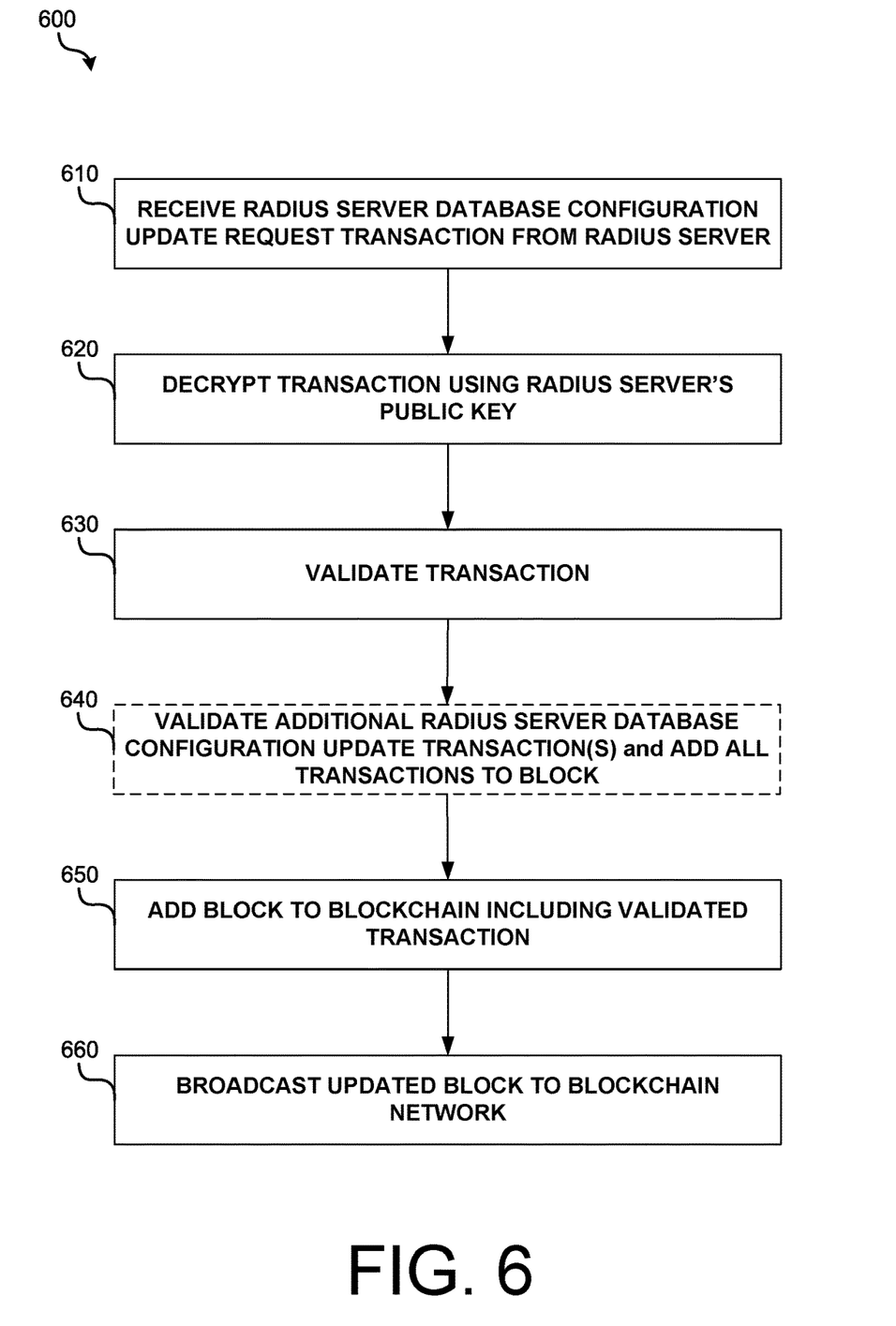
FIG. 6 is an operational flow diagram illustrating an example method that may be implemented by a RADIUS server on a blockchain network to verify a RADIUS server database configuration update transaction submitted by another RADIUS server and update the blockchain, in accordance with implementations of the disclosure.

FIG. 6 is an operational flow diagram illustrating an example method 600 that may be implemented by a RADIUS server (e.g., RADIUS server 300) on a blockchain network (e.g. network 390) to verify a RADIUS server database configuration update transaction submitted by another RADIUS server (e.g., RADIUS server 300) and update the blockchain, in accordance with implementations. In some implementations, method 600 may be implemented by a RADIUS server 300 using a processing device 320 to execute instructions (e.g., blockchain application 314 and/or RADIUS server application 315) stored on a computer readable medium 310. As noted above, the blockchain may be updated using any suitable consensus algorithm. In some implementations, the blockchain may be updated using a consensus based on a proof-of-ownership algorithm. In such implementations, for example, a proof-of-ownership algorithm may need to be produced to create a new block.

With specific reference now to the operations of method 600, at operation 610, a first RADIUS server of a blockchain network may receive a RADIUS server database configuration update transaction from a second RADIUS server. For example, the first RADIUS server may receive a transaction message that was broadcast or otherwise propagated by the second RADIUS server to a blockchain network for verification. In various implementations, the received transaction may be a digitally signed message that was encrypted with the second RADIUS server's private key. For example, the digitally signed message may be a string of text generated by applying the second RADIUS server's private key to the transaction.

At operation 620, the first RADIUS server may decrypt the received RADIUS server database configuration update transaction (e.g., digitally signed message) to verify that the second RADIUS server is the source of the request. For example, the first RADIUS server may apply the second RADIUS server's public key (e.g., known from a list of RADIUS server public keys as described above with reference to FIG. 5) to the message to decrypt it.

At operation 630, the first RADIUS server may validate the RADIUS server database configuration update transaction. Any suitable blockchain validation method may be used. In some implementations, the RADIUS server may validate the transaction by checking its present database configuration to determine if the update is a valid one. For example, if a configuration update comprises changing the access privileges of a user having associated credentials, the RADIUS server may determine that the user having the associated credentials exists in its database. In some implementations, all RADIUS servers on the blockchain network may validate the transaction.

At optional operation 640, the first RADIUS server may validate additional RADIUS server database configuration update transactions. For example, additional transactions shared by other RADIUS servers may be validated by the first RADIUS server (and decrypted) at around the time it validates the transaction received from the second RADIUS server. Alternatively, operation 640 may be skipped if no other RADIUS server database configuration update transactions require validation (e.g., depending on times when different transactions are received). Following validation, at operation 650, the first RADIUS server may add a new block to its respective copy of the blockchain, the added block including all of the validated RADIUS server database configuration update transactions.

In some implementations, the RADIUS server database configuration update transactions may be validated and the block may be added using a proof-of-ownership consensus algorithm. At operation 660, the first RADIUS server may share the added block to the blockchain network for other RADIUS servers to update their respective copy of the blockchain.

In this document, the terms "machine readable medium," "computer readable medium," and similar terms are used to generally refer to non-transitory mediums, volatile or non-volatile, that store data and/or instructions that cause a machine to operate in a specific fashion. Common forms of machine readable media include, for example, a hard disk, solid state drive, magnetic tape, or any other magnetic data storage medium, an optical disc or any other optical data storage medium, any physical medium with patterns of holes, a RAM, a PROM, EPROM, a FLASH-EPROM, NVRAM, any other memory chip or cartridge, and networked versions of the same.

These and other various forms of computer readable media may be involved in carrying one or more sequences of one or more instructions to a processing device for execution. Such instructions embodied on the medium, are generally referred to as "instructions" or "code." Instructions may be grouped in the form of computer programs or other groupings. When executed, such instructions may enable a processing device to perform features or functions of the present application as discussed herein.

In this document, a "processing device" may be implemented as a single processor that performs processing operations or a combination of specialized and/or general-purpose processors that perform processing operations. A processing device may include a CPU, GPU, APU, DSP, FPGA, ASIC, SOC, and/or other processing circuitry.

The various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. Additionally, unless the context dictates otherwise, the methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A method, comprising:
   receiving, at a first server that provides authentication, authorization, and accounting (AAA) of users that access a network, a user request to update a configuration of a database of the first server, the database comprising authentication credentials for users that access the network, wherein the first server and least one other server that provides AAA of users that access the network communicate over a distributed ledger network including a distributed ledger;

in response to receiving the user request, transmitting a transaction to the distributed ledger network for validation, the transaction comprising a request by the first server for each of the servers of the distributed ledger network to update their respective database configuration in accordance with the user request;

receiving at the first server, an update to the distributed ledger from the distributed ledger network, the update comprising a validation of the transaction that was transmitted to the distributed ledger network; and the first server updating its database configuration in response to receiving the update comprising the validation of the transaction;

receiving, at the first server, over the distributed ledger network, a second message from a second server, the second message comprising a second request to update a database configuration in accordance with a second user request, wherein the second request to update the configuration of the database comprises: a request to update one or more of: user credentials, user privileges, and an accounting of user access;

decrypting the received second message using a public key of the second server;

validating the second message, including the second request to update the database configuration in accordance with the second user request;

updating the distributed ledger with the validated second message; and transmitting the update to the distributed ledger to the distributed ledger network.

2. The method of claim 1, wherein the request to update the configuration of the database comprises: a request to update one or more of: user credentials, user privileges, and an accounting of user access.

3. The method of claim 2, wherein the first server and the at least one other servers maintain a respective copy of the distributed ledger, the respective copy of the distributed ledger comprising a history of database configuration updates made by the servers.

4. The method of claim 2, wherein the first server and the at least one other server are configured to maintain synchronized databases by updating their database configurations in response to validation by the distributed ledger network of requests to update database configurations.

5. The method of claim 1, wherein the first server updating its database configuration in accordance with the user request, comprises: the first server updating a configuration file comprising one or more of: user credentials and user privileges.

6. The method of claim 5, wherein the first server and the least one other server are Remote Authentication Dial-In User Service (RADIUS) servers.

7. The method of claim 1, wherein the distributed ledger network is a blockchain network, wherein the distributed ledger is a blockchain, wherein the update to the distributed ledger from the distributed ledger network comprises a block, the block comprising a validation of the request to update the database in accordance with the user request.

8. The method of claim 1, wherein a server of the distributed ledger validates the transaction by checking its database to determine that the configuration update can be made.

9. A non-transitory computer readable medium having executable instructions stored thereon, that, when executed by a processor, performs operations of:

receiving, at a first server that provides authentication, authorization, and accounting (AAA) of users that access a network, a user request to update a configuration of a database of the first server, the database comprising authentication credentials for users that access the network, wherein the first server and least one other server that provides AAA of users that access the network communicate over a blockchain network including a blockchain;

in response to receiving the user request, transmitting a transaction to the blockchain network for validation, the transaction comprising a request by the first server for each of the servers of the blockchain network to update their respective database configuration in accordance with the user request;

after the transaction is validated by the blockchain network, the first server updating its database configuration in accordance with the user request;

receiving, at the first server, over the distributed ledger network, a second message from a second server, the second message comprising a second request to update a database configuration in accordance with a second user request, wherein the second request to update the configuration of the database comprises: a request to update one or more of: user credentials, user privileges, and an accounting of user access;

decrypting the received second message using a public key of the second server;

validating the second message, including the second request to update the database configuration in accordance with the second user request;

updating the distributed ledger with the validated second message; and transmitting the update to the distributed ledger to the distributed ledger network.

10. The non-transitory computer readable medium of claim 9, wherein the first server and the least one other server are Remote Authentication Dial-In User Service (RADIUS) servers.

11. The non-transitory computer readable medium of claim 10, wherein the request to update the configuration of the database comprises: a request to update one or more of: user credentials, user privileges, and an accounting of user access.

12. The non-transitory computer readable medium of claim 11, wherein the first server and the at least one other server maintain a respective copy of the blockchain, the respective copy of the blockchain comprising a history of database configuration updates made by the servers.

13. The non-transitory computer readable medium of claim 11, wherein the first server and the at least one other server are configured to maintain synchronized databases by updating their database configurations in response to validation by the blockchain network of requests to update database configurations.

14. The non-transitory computer readable medium of claim 10, wherein the first server updating its database configuration in accordance with the user request, comprises: the first server updating a configuration file comprising one or more of: user credentials and user privileges.

15. The non-transitory computer readable medium of claim 10, wherein a server of the distributed ledger validates the transaction by checking its database to determine that the configuration update can be made.

\* \* \* \* \*